United States Patent
Becker

(10) Patent No.: US 10,230,409 B2
(45) Date of Patent: Mar. 12, 2019

(54) APPARATUS AND METHOD FOR REDUCED COMPUTATION AMPLIFIER GAIN CONTROL

(71) Applicant: Hughes Network Systems, LLC, Germantown, MD (US)

(72) Inventor: Neal D. Becker, Olney, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 15/163,436

(22) Filed: May 24, 2016

(65) Prior Publication Data

US 2017/0346507 A1 Nov. 30, 2017

(51) Int. Cl.
*H04B 7/06* (2006.01)
*H04B 7/08* (2006.01)
*H04B 1/10* (2006.01)
*H04B 1/04* (2006.01)

(52) U.S. Cl.
CPC ......... *H04B 1/0475* (2013.01); *H04B 1/1027* (2013.01); *H04B 7/0619* (2013.01); *H04B 7/0854* (2013.01); *H04B 7/0626* (2013.01); *H04B 7/0632* (2013.01); *H04B 2001/0408* (2013.01); *H04B 2001/1045* (2013.01)

(58) Field of Classification Search
CPC .. H04B 7/0619; H04B 7/0623; H04B 7/0632; H04B 7/0639; H04B 7/0641; H04B 7/0656; H04B 7/066; H04B 7/0663; H04B 1/0475; H04B 1/1027; H04W 52/04; H04W 52/24; H04W 52/243; H04W 52/247; H04W 52/26; H04W 52/265; H04W 52/38

USPC ............ 455/522, 68, 69, 114.2, 126, 127.1
See application file for complete search history.

(56) References Cited

U.S. PATENT DOCUMENTS

| | | | |
|---|---|---|---|
| 7,158,580 B1 | 1/2007 | Albulet | |
| 8,520,721 B2* | 8/2013 | Myers | H03J 7/02 |
| | | | 375/150 |
| 9,509,455 B2* | 11/2016 | Annavajjala | H04L 1/206 |
| 9,655,069 B2* | 5/2017 | Kelton | H04W 52/52 |
| 2002/0044539 A1* | 4/2002 | Ozluturk | H04B 1/707 |
| | | | 370/335 |
| 2003/0054762 A1* | 3/2003 | Karabinis | H04B 7/216 |
| | | | 455/12.1 |
| 2004/0120412 A1 | 6/2004 | Banerjea | |
| 2004/0203468 A1* | 10/2004 | Dent | H04B 7/022 |
| | | | 455/67.14 |
| 2008/0039129 A1* | 2/2008 | Li | H04L 1/0003 |
| | | | 455/522 |

(Continued)

OTHER PUBLICATIONS

International Search Report arid Written Opinion dated Aug. 31, 2017 by the International Searching Authority (European Patent Office) in PCT Application PCT/US2017/034091.

*Primary Examiner* — Duc M Nguyen
(74) *Attorney, Agent, or Firm* — NovoTechIP International PLLC

(57) ABSTRACT

Signals are received that include a channel band and an adjacent band. The channel band is demodulated to obtain recovered symbols. Cross-correlation between the recovered symbols and the adjacent band is estimated. Adjacent channel interference is estimated, using the estimated cross-correlation of the recovered symbols and the adjacent band. Upon the estimated adjacent channel interference meeting a condition, a back-off command is sent to a transmitter power amplifier.

22 Claims, 6 Drawing Sheets

(56) References Cited

U.S. PATENT DOCUMENTS

| | | | |
|---|---|---|---|
| 2008/0310479 A1* | 12/2008 | Koslar | H04B 1/692 375/131 |
| 2009/0086647 A1 | 4/2009 | Shnaider | |
| 2009/0092178 A1* | 4/2009 | Sayana | H04B 17/318 375/227 |
| 2009/0103494 A1* | 4/2009 | Ma | H04L 1/0618 370/331 |
| 2009/0286474 A1* | 11/2009 | Park | H04B 7/15578 455/20 |
| 2010/0104042 A1* | 4/2010 | Benjebbour | H04L 25/03834 375/285 |
| 2010/0232539 A1* | 9/2010 | Han | H04B 7/024 375/285 |
| 2011/0009125 A1* | 1/2011 | Shin | H04B 7/024 455/452.1 |
| 2012/0015680 A1* | 1/2012 | Yang | H04B 7/022 455/517 |
| 2012/0026940 A1* | 2/2012 | Barbieri | H04L 5/0032 370/328 |
| 2012/0046028 A1* | 2/2012 | Damnjanovic | H04W 24/02 455/423 |
| 2012/0108194 A1* | 5/2012 | Lindqvist | H04B 7/0854 455/296 |
| 2012/0170627 A1* | 7/2012 | Koike | H04B 7/0413 375/219 |
| 2012/0214524 A1* | 8/2012 | Wajcer | H04B 1/109 455/502 |
| 2012/0224549 A1* | 9/2012 | Myers | H03J 7/02 370/329 |
| 2013/0089159 A1* | 4/2013 | Liu | H04B 7/024 375/267 |
| 2014/0044095 A1* | 2/2014 | Li | H04W 16/14 370/331 |
| 2014/0321313 A1* | 10/2014 | Seo | H04J 11/00 370/252 |

* cited by examiner

APPARATUS AND METHOD FOR REDUCED COMPUTATION AMPLIFIER GAIN CONTROL

FIELD OF DISCLOSURE

The present application relates generally to control of amplifiers and, more particularly, to dynamic control of amplifier operating point.

BACKGROUND

Frequency Division Multiple Access (FDMA) is a communications technique that divides a frequency band into a plurality of sub-bands, i.e., channels. Each of a plurality of communication devices is assigned one of the channels. Each of the devices has a signal generating circuit that generates a preamplified communication signal within its assigned channel. Each of the devices amplifies the preamplified communication signal with a transmitter power amplifier that feeds the amplified communication signal to a transmitter antenna. The plurality of communication signals from the plurality of communication devices will not interfere with one another provided each stays within its channel band. However, transmitter power amplifiers can have non-linearities, meaning the output may not be linearly proportional to the input. The non-linearity can create distortion in the amplified signal transmitted. The distortion can appear as signals outside of the channel, which can extend into one or more of its adjacent channels, an effect termed "adjacent channel interference." Costs can include communication signals degrading adjacent channel quality, as well as waste of amplifier power.

There are conventional techniques directed to reducing adjacent channel interference, but all have various shortcomings. For example, one is to use a larger power amplifier, which can transmit the communication signal with its operating point substantially backed-off substantially from its compression point (the upper end of the linear region). This can carry costs in power and heat.

A modification of the larger amplifier technique described above is to use a transmitter power amplifier having just slightly above the transmission power requirement, and to set its operating point as close as possible to the maximum point before distortion becomes unacceptable. Costs, though, include a reduced safety margin for operating point drift.

Another conventional technique is to closely control the level of the input feed to the amplifier. However, even if the drive level is measured accurately, and kept reasonably constant, amplifier characteristics can change, e.g., over temperature and frequency. Compensation, e.g., temperature monitor circuitry in the transmitter, can be applied, but can have undesirable overhead costs.

Another conventional technique directed to reducing adjacent channel interference is to monitor power output of transmitter power amplifier. However, the monitoring can add significant hardware to the amplifier, and can degrade its operation. Also, due to fabrication variances, different samples of the power amplifier can exhibit different power versus distortion characteristics.

In addition, there are conventional techniques for directly measuring adjacent channel interference, including at a receiver. However, conventional measurement techniques can be computationally intensive and can require interruption of system operation.

Accordingly, what is needed is a method to reliably measure amplifier operating point without requiring special instrumentation on the transmit side, and without being computationally expensive.

SUMMARY

This Summary identifies features and aspects of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

In a general aspect, a method for controlling transmitter amplifier can include receiving a frequency band that includes an assigned channel, an adjacent channel, and a communication signal from the transmitter amplifier in the assigned channel; determining cross-correlation coefficients, between the communication signal and the adjacent channel; estimating an adjacent channel interference, based at least in part on the cross-correlation coefficients; and upon the estimated adjacent channel interference meeting a given condition, initiating communication of an operating point notice, toward a local control of the transmitter amplifier.

Particular implementations may also include one or more of the following features. The operating point notice can be sent by wireless transmission, for example, by uplink transmission from an earth station to a satellite, and downlink transmission from the satellite toward the local control. Determining cross-correlation coefficients can include demodulating the communication signal to obtain a recovered symbol, and the cross-correlation coefficients can correspond to different time offsets from the recovered symbol.

Estimating adjacent channel interference can include estimating a correlation magnitude and comparing the magnitude to a threshold. The correlation magnitude can be determined by a combining of the cross-correlation coefficients, for example, a maximum-ratio combining. Methods can also include estimating second adjacent channel cross-correlation coefficients, between the communication signal and the second adjacent channel, and estimating the adjacent channel interference can be further based, at least in part, on the second adjacent channel cross-correlation coefficients.

In a general aspect, a receiver apparatus for controlling a transmitter amplifier operating point can include a receiver antenna; a filter coupled to the receiver antenna and configured to pass an assigned channel and an adjacent channel; a cross-correlation coefficient logic can be configured to generate a set of cross-correlation coefficients, between the assigned channel and the adjacent channel; an adjacent channel interference estimation logic can be configured to estimate an adjacent channel interference, based at least in part on the set of cross-correlation coefficients; and an operating point notice command logic can be configured to generate an operating point notice in response to the estimated adjacent channel interference.

Particular implementations may also include one or more of the following features. The cross-correlation coefficient logic can include demodulator logic, that may be configured to demodulate a signal in the assigned channel and output a corresponding recovered symbol; and a symbol sampler that can be configured to sample the recovered symbol and generate a corresponding symbol sample, and the cross-correlation coefficient logic can be configured to generate the set of cross-correlation coefficients based on a set of time differences between symbol sample and the adjacent channel. The adjacent channel interference estimation logic can be configured to estimate the cross-correlation, based at least in part on applying different weightings to the cross-correlation coefficients in the set of cross-correlation coefficients.

In one implementation, the demodulator logic can be configured to demodulate a signal in the assigned channel and output a corresponding recovered symbol stream, and can include a recovered symbol sampler, configured to sample the recovered symbol stream and generate, for each symbol in the recovered symbol stream, a corresponding symbol sample. The cross-correlation coefficient logic can include an adjacent channel sampler, configured to sample the adjacent channel at a rate and timing that generates, in association with each symbol sample, M adjacent channel samples, corresponding to M different time offsets relative to the symbol sample. In one implementation, the cross-correlation coefficient logic can be configured to multiply a symbol sample among the symbol samples by each of the M corresponding adjacent channel samples, to generate a set of M products, and store the set of M products in a set of M accumulators, to initialize a set of M sums-of-products. The implementation can further configure the cross-correlation logic to repeat for K iterations an operation that includes to multiply a next symbol sample among the symbol samples by each of the M adjacent channel samples corresponding to the next symbol sample, to generate a new set of M products, and to add the new set of M products to the set of M accumulators, to update the set of M sums-of-products. In an implementation, after the K iterations, the cross-correlation logic can output the content of the set of M accumulators as a set of M cross-correlation coefficients.

BRIEF DESCRIPTION OF THE DRAWINGS

The accompanying drawings are presented to aid in the description of example aspects and are provided solely for illustration of the embodiments and not limitation thereof.

DETAILED DESCRIPTION

Figure 1:
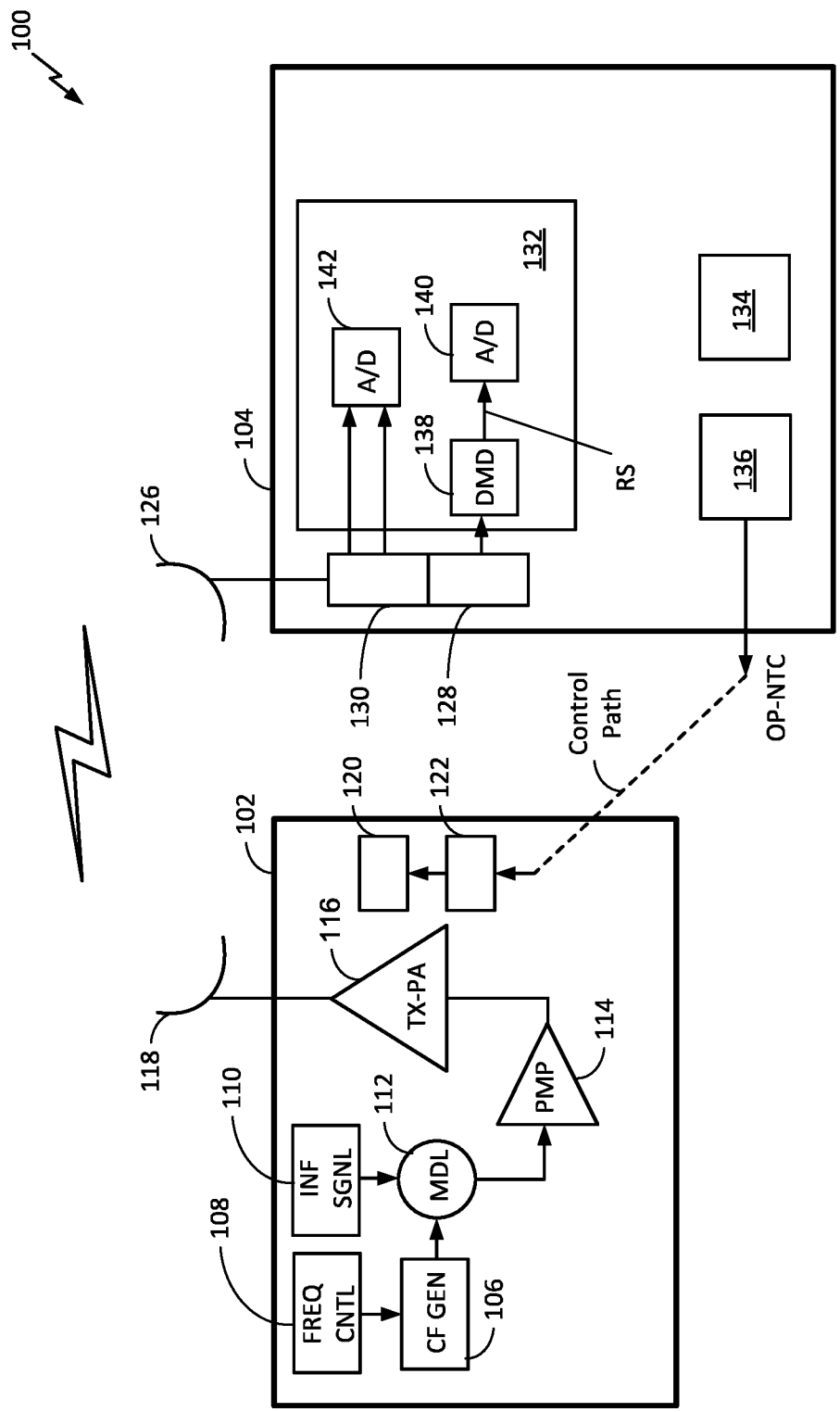
FIG. 1 shows a block schematic, representing one example system having reduced computation operating point control, according to various aspects.

Aspects and features, and exemplary implementations practices and applications are disclosed in the following description and related drawings. Alternatives to disclosed examples may be devised without departing from the scope of disclosed concepts.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

Various exemplary aspects and illustrative implementations thereof are described in terms of sequences of actions performed, for example, by elements of a computing device. It will be recognized that such actions described can be performed by specific circuits (for example, application specific integrated circuits (ASICs)), by program instructions being executed by one or more processors, or by a combination of both. Additionally, such sequence of actions described herein can be considered to be implemented entirely within any form of computer readable storage medium having stored therein a corresponding set of computer instructions that upon execution would cause an associated processor to perform the described herein. Thus, the various aspects of can be implemented in a number of different forms, all of which are contemplated to be within the scope of the claimed subject matter. In addition, example forms and implementations for actions and operations may be described, for example, as "logic configured to" perform the described action.

In an aspect, a transmitter device generates a pre-amplified communication signal by modulating a carrier with an information signal, e.g., symbols such as binary bits, then feeds the pre-amplified communication signal to the input of a transmitter final stage power amplifier. For brevity, "transmitter final stage power amplifier" will be abbreviated as "TX-PA." The TX-PA amplifies the pre-amplified communication signal and feeds the amplified communication signal to a transmitter antenna.

The communication signal, according to an aspect, can have an assigned channel. If the TX-PA is operating in an "ideal" manner—meaning perfectly linear over the intended range of output amplitude—the spectrum of that output communication signal will remain within the assigned channel. However, as introduced in the Background, known power amplifiers can have non-linearity, which can introduce distortion. Frequency components of the distortion, generically referred to in this description as "out-of-channel distortion," can extend outside of the assigned channel.

The TX-PA transmits the communication signal, which includes in-channel signal and out-of-channel distortion, from the transmit antenna, for wireless propagation to a receiver antenna and an attached receiver.

To operate, the receiver has knowledge of the assigned channel. For example, if the TX-PA transmits according to a multiple frequency (MF)-TDMA scheme, the receiver synchronized to the scheme. The receiver can apply a band-selective filter configured to pass only the assigned channel and the set of channels that, if the TX-PA output has distortion, will contain at least a significant portion of the distortion signals. Such channels can be termed "adjacent channels." It will be understood, though, that the term "adjacent channel(s)", as used in this description, is(are) not limited to frequency bands directly adjacent the assigned channel.

The receiver can recover the symbol stream from the assigned channel using, for example, and conventional technique demodulation. The demodulation result can be a stream of symbols, with each symbol being complex-valued, having a real component and a quadrature component. The adjacent channel(s) passed by the band-selective filter can each include an adjacent channel real component and an adjacent channel quadrature component.

In an implementation, the receiver can obtain the recovered symbol stream and the adjacent channel(s) from the band-selective filter as analog signals, and then digitize these signals by a post-recovery symbol sampling, and a post-bandpass filter adjacent channel sampling. The sampling, in an aspect, can sample the recovered symbol stream at a rate of one sample per symbol, and correspondingly sample the adjacent channel(s) at a rate of M times the symbol rate. In an aspect, the adjacent channel sample concurrent in time with the symbol sample can be the "first" or "zeroth" sample, followed by a sequence of M−1 additional samples, spaced apart in time by the inverse of the sampling clock.

The succession of symbol samples, each with a corresponding M adjacent channel samples can be fed to a computation process that can compute M cross-correlation coefficients, labeled Cj, for j=1 to M−1, according to Equation (1):

$$C_j = \Sigma_k S_k A_{j+Mk}$$  Equation (1)

where, $S_k$ is the symbol sample, k ranges from 0 to K, and $A_{j+Mk}$ is the conjugate of the adjacent channel sample that is offset by j delays from the symbol sample $S_k$.

Theoretically, K can be infinity. However, practical values of K can be used and can be selected based on application specific parameters without undue experimentation by a person of ordinary skill having possession of this disclosure.

Referring to Equation (1), $C_j$ is the cross-correlation coefficient between the sample stream $S_k$ and the adjacent channel sample stream $A_{Mk}$ delayed by j increments of the sample clock. Each $C_j$ can be computed as a running sum of products, each product being the complex-valued symbol sample $S_k$ multiplied by the conjugate of the adjacent channel sample delayed by j increments. In an implementation, $C_j$ for j=0 can be the cross-correlation coefficient between the symbol sample stream $S_k$ and the adjacent channel sample stream $A_{Mk}$ with no delay. After K symbol samples are received, each with a corresponding plurality of M samples of the adjacent channel, the computed value of each $C_j$ is a sum of K products. If $C_j$ is large relative to the other M−1 cross-correlation coefficients, there is an estimated statistical correlation between the symbol stream and the adjacent channel delayed by j increments.

In an aspect, indices of Equation (1) can be modified such that the adjacent channel sample concurrent with the symbol sample is approximately the middle sample. In other words, every symbol sample $S_k$ can have a corresponding set of M adjacent channel samples, of which approximately M/2 precede the symbol sample $S_k$ and approximately M/2 lag the symbol sample. Upon completion of operations as described herein, the set of M cross-correlation coefficients is symmetric. In a symmetric set of cross-correlation coefficients, referring to Equation (1), $C_0$ is the cross-correlation coefficient between the symbol sample stream $S_k$ and the adjacent channel sample stream $A_{Mk}$ with no delay. $C_1$ is the cross-correlation coefficient between the symbol sample stream $S_k$ and the adjacent channel sample stream delayed by 1 increment of the sample clock. $C_{-1}$ is the cross-correlation coefficient between the sample stream $S_k$ and the adjacent channel sample stream advanced by 1 increment of the sample clock. In other words, the symbol sample stream lags the adjacent channel sample stream by 1 increment of the sample clock.

FIG. 1 shows a block schematic, representing one example system 100 that features reduced computation operating point control, according to various aspects. As shown, the system 100 can include a transmitter station 102 and a receiver station 104. It will be understood that "station," in this context, implies nothing as to physical size, location, or mobility. For example, the transmitter station 102 can be, without limitation, an outdoor unit (ODU) for a Very Small Aperture Terminal (VSAT). As another example, transmitter station 102 can include a hand-carried communication device. In addition, the terms "transmitter" and "receiver," in the context of "transmitter station 102" and "receiver station 104," imply nothing as to device type. For example, implementations of the transmitter station 102 and the receiver station 104 can be respective copies of an identical design, each having functionality of both the transmitter station 102 and receiver station 104, as described herein.

The transmitter station 102 can include a carrier signal generator 106, a carrier frequency control 108, an information signal source 110, a modulator 112, a preamplifier 114, a transmitter power amplifier (TX-PA) 116, and a transmit antenna 118. The carrier signal generator 106 can be configured for operation in any band currently used, or usable in the future for digital communications, for example, UHF and SHF, e.g., Ku (12-18 GHz), Ka (26.5-40 GHz), and other bands. The carrier frequency control 108 can be configured to maintain the carrier signal generator 106 at a fixed frequency, or can provide non-periodic frequency shifting, for example, in response to a change frequency command. In an implementation, the carrier frequency controller 108 can also be configured to hop the carrier frequency, for example, according to a given pattern. The pattern can be configured, for example, to provide multiple frequency (MF) TDMA.

An example information signal source 110 may be an elastic buffer, configured to receive, and buffer for transmission, a symbol stream from a processor (not visible in FIG. 1). Regarding features and configurations of the modulator 112, contemplated practices according to this disclosure have no limitations other than a capability to modulate the carrier signal to carry a symbol stream. Illustrative example modulator types can include, but are not limited to, BPSK, QPSK, M-ary Quadrature Amplitude Modulation (QAM), and other known modulation techniques.

Regarding implementations of the carrier signal generator 106, carrier frequency control 108, information signal source 110, modulator 112, preamplifier 114, and transmit antenna 118, in an aspect, each may be implemented by components from known techniques for carrier signal generators, information signal sources, modulators, preamplifiers and antennas. A detailed description of such techniques and their related technologies has been omitted for conciseness.

Referring to FIG. 1, in an aspect, the transmitter station 102 can include a TX-PA operating point adjustment circuit 120, coupled to the TX-PA 116, and an operating point controller 122 coupled to the operating point adjustment circuit 120. The operating point controller 122 can be configured, for example, to receive a receiver-generated operating point notice, which is labeled "OP-NTC" in FIG. 1.

Regarding implementation of the TX-PA operating point adjustment circuit 120, in an aspect, other than its interface with the operating point controller 122, the TX-PA operating point circuit 120 may employ components from known techniques for moving the operating point of a transmitter power amplifier. A detailed description of such techniques and their related technologies has been omitted for conciseness.

FIG. 1 graphically indicates, by a directed arrow labeled "Control-Path" a logical communication of OP-NTC from the receiver station 104 to the transmitter station 102. In an aspect, any means may be employed for the Control Path from the receiver station 104 to the transmitter station 102. For example, the Control Path can include direct wireless transmission, as well as uplink-downlink satellite transmission, or ground-based repeater communications. In addition the Control Path can include, without limitation, the Internet (e.g., via TCP/IP, UDP, or other protocols), and cellular telephone networks.

Continuing to refer to FIG. 1, the receiver station 104 can include a receiver antenna 126, feeding a filter resources such as assigned channel filter 128 and an adjacent channel filter 130. The assigned channel filter 128 can be configured to pass only the assigned channel. The adjacent channel filter 130 can be configured to pass, when the assigned channel is known, only adjacent channels that (assuming TX-PA 116 has distortion), will contain at least a significant portion of the distortion signals.

It will be understood that the assigned channel filter 128 and the adjacent channel filter 130 are not necessarily distinct circuitry. For example, the assigned channel filter 128 and the adjacent channel filter 130 can be respective portions of a common frequency selective filter (not visible in FIG. 1). The frequency selective filter can include, but is not limited to, a tandem arrangement of a frequency block converter (not visible in FIG. 1) feeding a bank of bandpass or channelizing filters (not visible in FIG. 1). Also, in an aspect, the assigned channel filter 128 and the adjacent channel filter 130, or both, can be configured with variable bandwidth.

In an aspect, the receiver station 104 can include cross-correlation coefficient logic 132, in combination with adjacent channel interference estimation logic 134, and operating point notice logic 136. The cross-correlation coefficient logic 132 can be configured to receive the assigned channel from the assigned channel filter 128, and the adjacent channel from adjacent channel filter 130. The cross-correlation coefficient logic 132 can be further configured to generate, based on the output from filters 128 and 130, a set of cross-correlation coefficients (not explicitly visible in FIG. 1). The adjacent channel interference estimation logic 134 can be configured to estimate a cross-correlation, based at least in part on the set of cross-correlation coefficients generated by the cross-correlation coefficient logic 132. The operating point notice command logic 136 can be configured to generate an operating point notice, such as the example OP-NTC, in response to the estimated cross-correlation.

The cross-correlation coefficient logic 132, in an aspect, can include demodulator logic 138. The demodulator logic 138 can be configured to demodulate (e.g., BPSK, QPSK, M-ary QAM) a signal in the assigned channel and output a recovered symbols stream RS. The demodulator logic 138 can be implemented by known techniques. A detailed description of such techniques and their related technologies has been omitted for conciseness.

The cross-correlation coefficient logic 132 can include a first sampler 140, which can be configured to sample the recovered symbol stream RS from the demodulator logic 138, and generate a corresponding stream of symbol samples. In an aspect, the cross-correlation coefficient logic 132 can further include a second sampler 140. The second sampler 140 can be configured to sample the adjacent channel from the adjacent channel filter 130, at a rate and timing that generates, in association with the symbol sample output from the first sampler, and a set of M adjacent channel samples, corresponding to M different time offsets relative to the symbol sample. In an aspect the first sampler 140 and the second sampler 142 can be implemented separately. In an alternative implementation, the first sampler 140 and second sampler 142 can be implemented as portions of a wide bandwidth A/D conversion resource (not explicitly visible in FIG. 1). For additional control or setting of time alignment of the adjacent channel signal, as sampled by the second sampler 140, to the symbols sampled by the first sampler 140, a timing interpolator (not visible in FIG. 1) or equivalent may be placed in the path of the adjacent channel, for example, between the adjacent channel filter 130 and the second sampler 142. The interpolator, or equivalent can be implemented by known signal delay techniques. Detailed description of such techniques and their related technologies is omitted for conciseness.

The set of M adjacent channel samples, for example, can be according to the Equation (1) variable A, for j=L/2 to L/2. The variable "L" is used because, for odd values of M in combination with the cross-correlation coefficients being symmetric, setting L=M−1 defines M adjacent channel samples, symmetric about "0." In an aspect, the cross-correlation coefficient logic 132 can be configured to generate a set of M cross-correlation coefficients, such as $C_j$ as defined in Equation (1), each being a multiplication product of the symbol sample and a corresponding one of the M adjacent channel samples.

In an aspect, the adjacent channel interference estimation logic 134 can be configured to estimate the cross-correlation, based at least in part on applying different weightings to the cross-correlation coefficients in the set of cross-correlation coefficients. For example, the adjacent channel interference estimation logic 134 can be configured to apply maximum ratio combining.

Referring to FIG. 1, TX-PA operating point notice logic 136 can be configured to perform functions including storing one or more ACI thresholds and, using as an estimated ACI the estimated correlation magnitude, comparing the estimated ACI to the threshold ACI and, upon a result of the comparing, generating an operating point notice. The TX-PA operating point notice logic 136 can be further configured to cause a transmission of the operating point notice to the transmitter station 102. In an aspect, the TX-PA operating point control logic 136 can be configured to generate, as the operating point notice, or in addition to the operating point notice, an operating point change command, such as a back-off command. Accordingly, disclosed systems and methods provide, among other features, reduced computation amplifier gain adjustment.

Figure 2A:
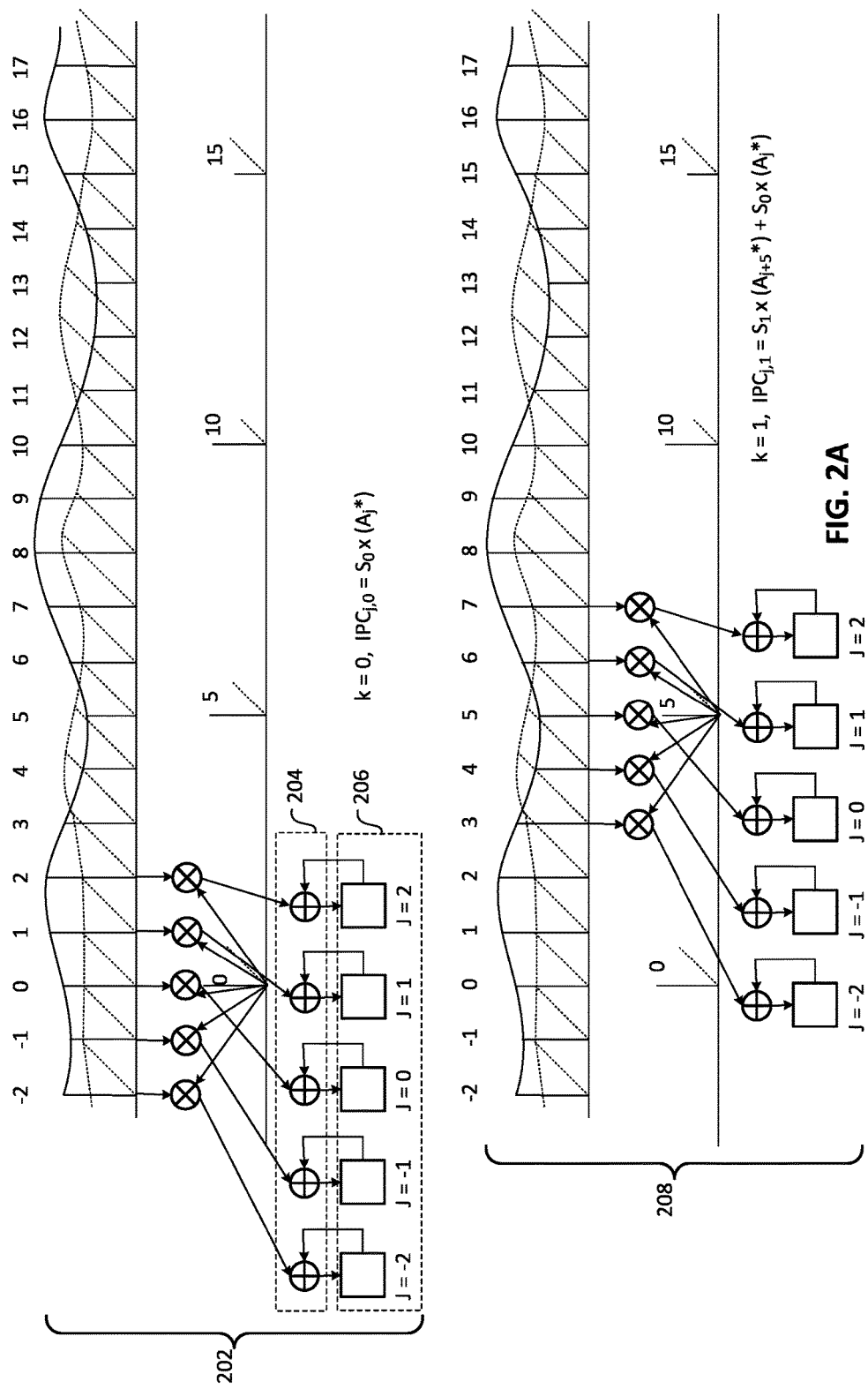
FIGS. 2A and 2B are a two-sheet graphical illustration of operations in one reduced computation process for determining cross-correlation, in one constructed example context.
Figure 2B:
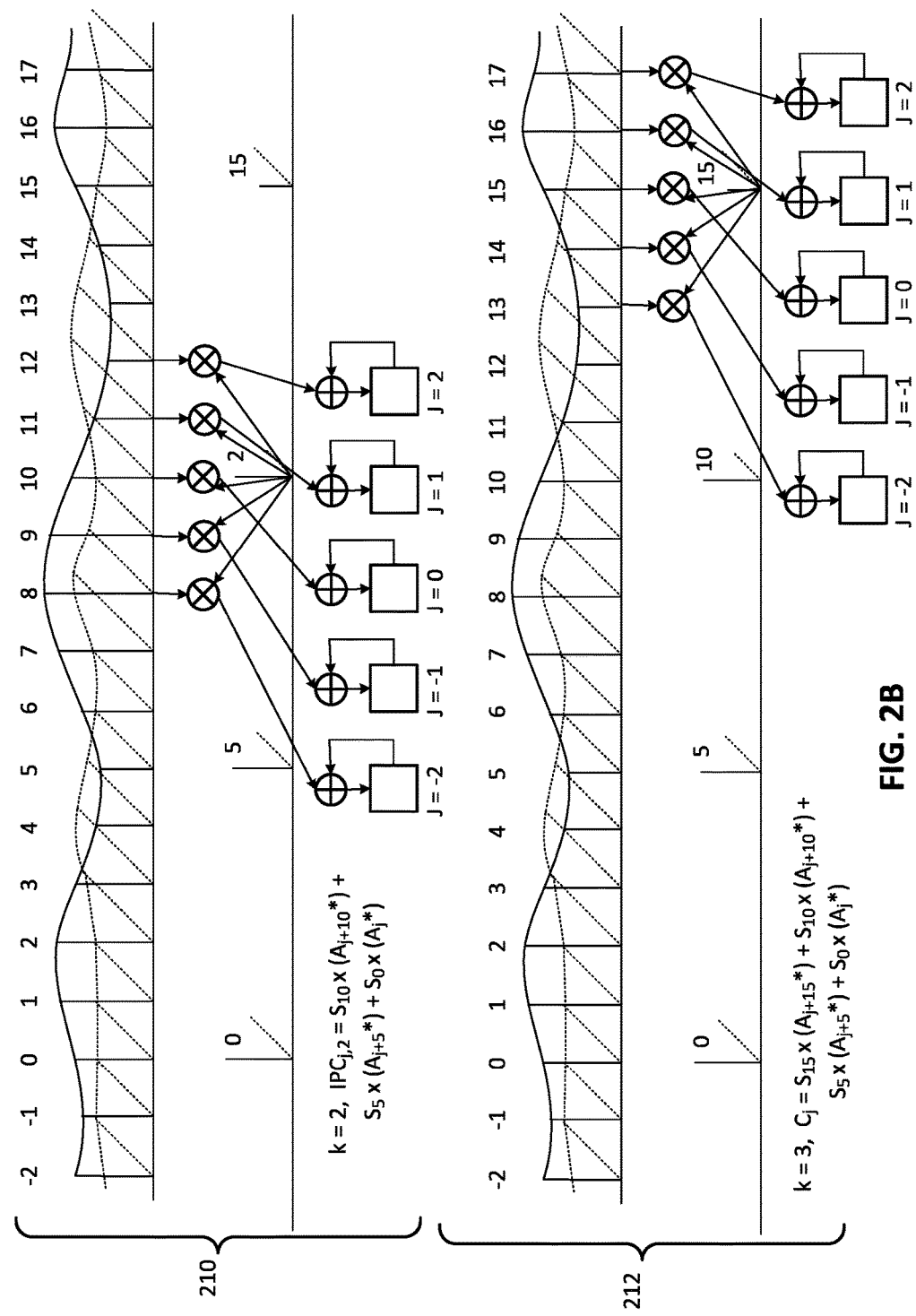

FIGS. 2A and 2B are a two-sheet graphical illustration of operations in one reduced computation process for determining cross-correlation, in one constructed example context. The example graphically illustrates computation of a set of 5 symmetric cross-correlation coefficients, applying an algorithm corresponding to Equation (1). The example context sets M=5 and sets K at 3. The index for K, which is k, starts at 0. Therefore, K=3 means the computation illustrated by FIGS. 2A and 2B includes four iterations. Since the generation is of symmetric cross-correlation coefficients the index j, at each iteration, has values −2, −1, 0, 1, and 2. The adjacent channel samples are shown from −2 to 17. The in-progress values of the 5 cross-correlation coefficients are labeled $IPA_{jk}$, where k=0 for the first iteration, k=1 for the second iteration, k=2 for the third iteration, and k=3 for the fourth and last iteration.

Referring to iteration 202 in FIG. 2B, the first symbol sample $S_0$ has an associated set of 5 adjacent channel samples, offset from $S_0$ by j increments of the sample clock, for j=−2, −1, 0, 1, and 2. Using the logical multiplier array 204, the first iteration 202 multiplies the symbol sample $S_0$ by the conjugate of each of the set of samples, $A_{−2}, A_{−1}, A_0, A_1$, and $A_2$ to generate 5 products, and loads the 5 products into the logical accumulators 506. The logical multiplier array 204 and logical accumulators 206 can be respective resources in the cross-correlation coefficient logic 132. It will be understood that each of the logical multipliers in the logical multiplier array 204 represents a complex multiplier. The complex multiplier can be implemented, for example, by four logical multipliers (not explicitly visible in the figures), and two (2) adders (not explicitly visible in the figures). It will also be understood that implementations of the logical multiplier array 204 are not limited to 5 distinct complex multiplier circuits. For example, the logical multiplier array 204 can be implemented by a single complex multiplier having a capacity to perform the 5 complex multiplications at the required rate. Regarding specific values for the required rate, persons of ordinary skill will understand the value is application specific. It will also be understood that "multiplier," as used in this disclosure, encompasses look-up-table and other implementations. It will likewise be understood that the logical accumulators 206 are not necessarily dedicated accumulator devices. For example, implementations include a software assignable register bank (not explicitly visible in FIG. 1) in the cross-correlation coefficient logic 132. The in-progress result of iteration 202 can be represented by Equation (2):

$$IPC_{j,0} = S_0 A_j; \; j=-2,-1,0,1,2 \quad \text{Eqn. (2)}$$

Referring to FIG. 2A, in a second iteration 208, a second symbol sample is denoted as $S_5$, because it aligns with adjacent channel $A_5$. This index scheme can be implemented, for example, by inserting 4 instances of logical "0" between each actual symbol sample. In addition, it will be understood that the specific indexing scheme used for this description is not a limitation on the scope of disclosed concepts and aspects thereof. On the contrary, persons of ordinary skill, upon reading this description, may see various alternative indexing schemes to track operations such as graphically illustrated in FIGS. 2A and 2B.

The second iteration 208 multiplies the second symbol sample $S_5$ by the conjugate of each of its corresponding set of 5 adjacent channel samples, $A_3, A_4, A_5, A_6$, and $A_7$ to generate a second set of 5 products, and adds the second set of 5 products to the logical accumulators 206. The in-progress result of the second iteration 208 can be represented by Equation (3):

$$IPC_{j,1} = S_5 A_{j+5} + S_0 A_j; \; j=-2,-1,0,1,2 \quad \text{Eqn. (3)}$$

Referring to FIG. 2B, a third iteration 210 multiplies the third symbol sample $S_{10}$ by the conjugate of each of its corresponding set of samples, $A_8, A_9, A_{10}, A_{11}$, and $A_{12}$ to generate a third set of 5 products, and adds the third set of 5 products to the logical accumulators 206. The in-progress result of the second iteration 210 can be represented by Equation (4):

$$IPC_{j,2} = S_{10} A_{j+10} + S_5 A_{j+5} + S_0 A_j; \; j=2,1,0,1,2 \quad \text{Eqn. (4)}$$

As also shown in FIG. 2B, a fourth and last iteration 212 multiplies the fourth symbol sample $S_{15}$ by the conjugate of each of its corresponding set of samples, $A_{13}, A_{14}, A_{15}, A_{16}$, and $A_{17}$ to generate a fourth set of 5 products, and adds the fourth set of 5 products to the logical accumulators 206. The result is the set of 5 cross-correlation coefficients, which can be represented by Equation (5):

$$C_j = S_{15} A_{j+15} + S_{10} A_{j+10} + S_5 A_{j+5} + S_0 A_j; \; j=-2,-1,0,1,2 \quad \text{Eqn. (5)}$$

Applications of practices according to disclosed concepts and aspects thereof can include provision of reduced computation estimating of ACI and related control of the RF output power amplifier contained in an ODU of a VSAT system.

Figure 3:
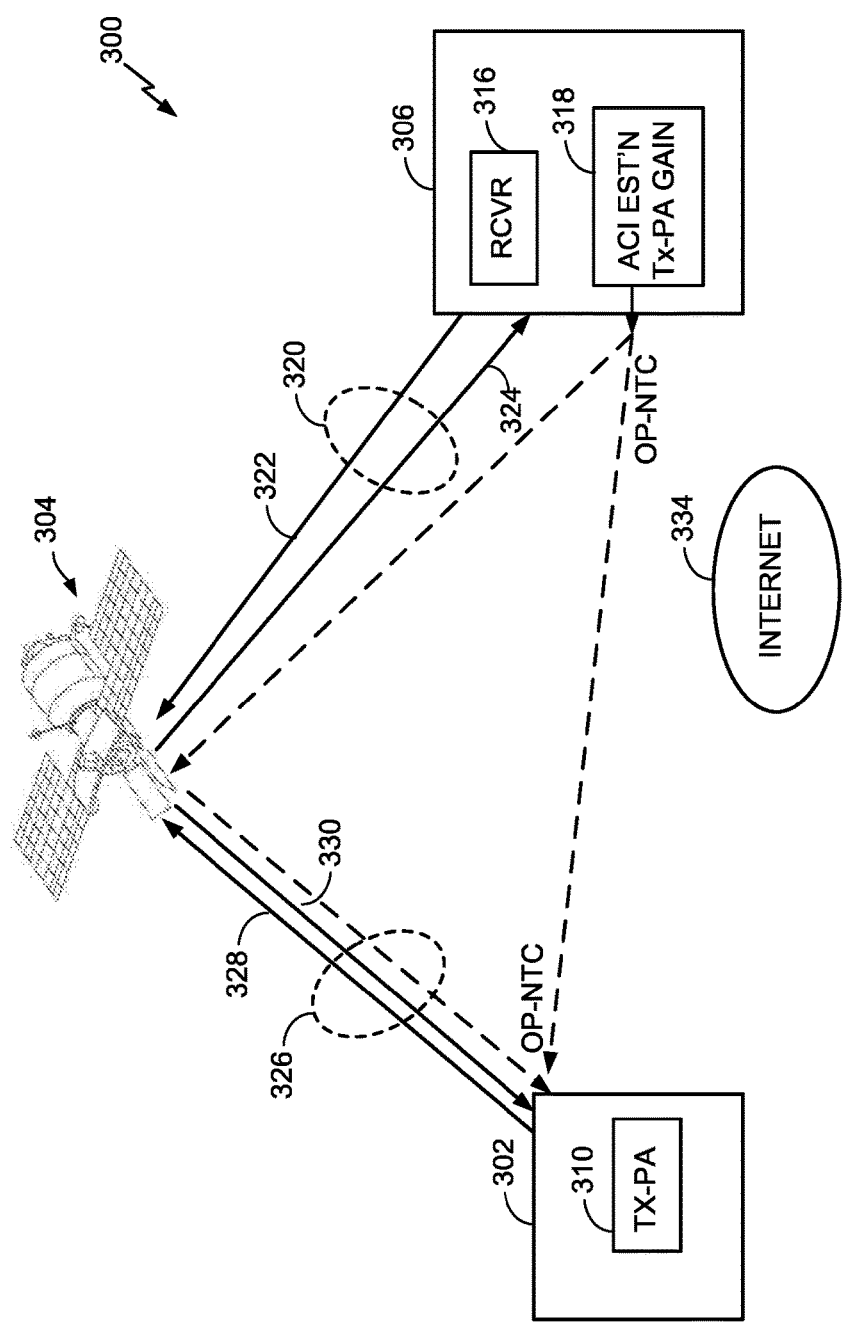
FIG. 3 illustrates one example implementation of a VSAT (very small aperture terminal) system with reduced computation operating point control, according to various aspects.

FIG. 3 depicts a block diagram of an example satellite communication system in which applications according to disclosed concepts and aspects can be practiced. The satellite communication system 300 can include VSAT 302, satellite 304, and hub station 306. FIG. 3 graphically depicts the satellite communication system 300 having a single VSAT 302, single satellite 304, and single hub station 306. It will be understood, though, that the each of these elements can be representative of a respective population (for example, there may be hundreds, thousands, or millions of VSATs configured much like VSAT 302). The VSAT 302 can include a terminal uplink power amplifier (PA) 310 (e.g., the FIG. 1 TX-PA 116) that drives terminal uplink antenna (not visible in FIG. 2). The hub station 306 can include a downlink antenna (not visible in FIG. 3) feeding a hub receiver 316. The hub receiver 316 can include a reduced computation ACI estimation/terminal PA gain control unit 318. Feeder links 320 may carry data between the hub station 306 and the satellite 304. The feeder links 320 can include forward uplink 322 for transmitting data from the hub station 306 to the satellite 304, and return downlink 324 for transmitting data from the satellite 304 to the hub station 306. The satellite communication system 300 can include user links 326 for carrying data between the satellite 304 and the VSAT 302. The user links 326 may include return uplink 328 for transmitting data from the VSAT 302 to the satellite 304, and a forward downlink 330 for transmitting data from the satellite 304 to the VSAT 302.

In an aspect, the hub station 306 may be a high capacity, large antenna earth station. The hub station 306 may include connectivity to ground telecommunications infrastructure, for example the Internet 334. In an aspect, the VSAT 302 can also connect (not explicitly shown) to the Internet 334, or to other ground communications infrastructure, for example, via the satellite 304 and hub station 306. The VSAT 302 can send data to the Internet 334, for example, by transmission from the terminal uplink PA 310, on the return uplink 328 to the satellite 304, and then from the satellite 304, over the return downlink 324 to the hub station 306. The hub station 306 may then transmit the data to the Internet 334. Data from the Internet 334 may be sent to the VSAT 302 through the hub station 306, the forward uplink 322 to the satellite 304, and the forward downlink 330.

The VSAT 302 may be assigned a VSAT uplink channel. The VSAT uplink channel can be a logical channel, for example, assigned certain frequency resources according to MF-TDMA. The hub station 306 will have knowledge of the assignment. The hub receiver 316 can therefore track, in lock step, the MF-TDMA pattern of the VSAT 302. The ACI estimation/terminal PA gain control unit 318 can then, at each MF-TDMA hop of the VSAT 302, estimate a cross-correlation between the instant frequency slot used by the VSAT 302, and one or two adjacent frequency slots. The ACI estimation/terminal PA gain control unit 318, upon detecting an estimated ACI exceeding a threshold, can send an OP-NTC by optional paths. One, shown in dotted lines, which is the forward uplink 322 to the satellite 304, and forward downlink 330 to the VSAT 302.

Figure 4:
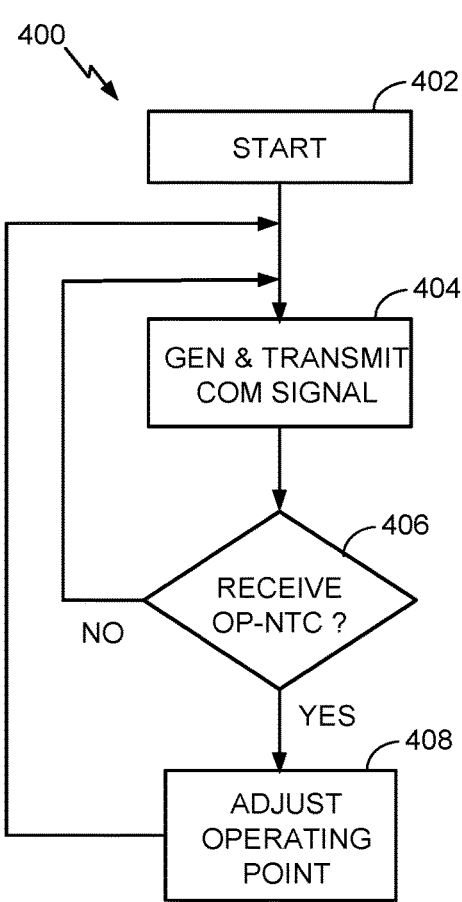
FIG. 4 shows a flow diagram, representing example operations in a process of estimating adjacent channel interference, and of generating associated back-off commands, within a reduced computation method providing operating point control, according to one or more embodiments.

FIG. 4 shows a logic diagram of a flow 400, representing example operations of a transmitter with configured with a power amplifier that includes operating point control, such as the FIG. 1 back-off controller 122 and back-off adjustment circuit 120. Example performances of various operations in flow 400 will be described in reference to the FIG. 1 system 100.

Referring to FIG. 3, example operation in the flow 400, in one method, can start at 302, with operations initializing the transmitter. In an aspect, at least in some applications, block 402 can be omitted. In an aspect, operations at 402 can include setting the operating point of the transmitter power amplifier at a start point. Referring to the FIG. 1 system 100, such operation could include loading the operating point controller 122 with a starting OP-NTC, or with a fixed default. Additional features may be included. For example, operations at 402 may include setting the operating point at its most recent operational value, for example, prior to a power loss.

From 402, the flow 400 can proceed to 404, at which operations can provide generating and transmitting a communication signal, from the transmitter power amplifier (e.g., FIG. 1 item TX-PA 116). Concurrent with 404, the flow 400 can include a loop 406 of "until receipt of OP-NTC." In an example implementation, the loop operations at 406 can provide a periodic polling of a re-settable status flag or equivalent. One example exit condition can be detecting receipt of the OP-NTC. In another example, operations at 406 can be configured as an interrupt, the exit condition being "upon receipt of OP-NTC." Upon the exit condition at 406, the flow 400 can proceed to 408 and apply operations adjusting the operating point according to the OP-NTC. Example operations at 408 can include the operating point controller 122 sending appropriate control signals to the operating point adjustment circuit 120. In an aspect, the transmitter power amplifier, and its operating point adjustment circuit 120, can be configured to perform operating point adjustment without interrupting transmission.

In an aspect, the flow 400 and, as required, the system 100 can be configured to provide acknowledgment of receiving at 406 the OP-NTC, or completing the operating point adjustment at 408, or both. In a further aspect, the flow 400 and, as appropriate, the system 100 can be configured to send such acknowledgment to entities additional to, or in place of the receiver station 104. For example, a system such as the system 100 may be configured to include an additional system monitoring capability (not explicitly visible in the figures), such as a log-type record.

Figure 5:
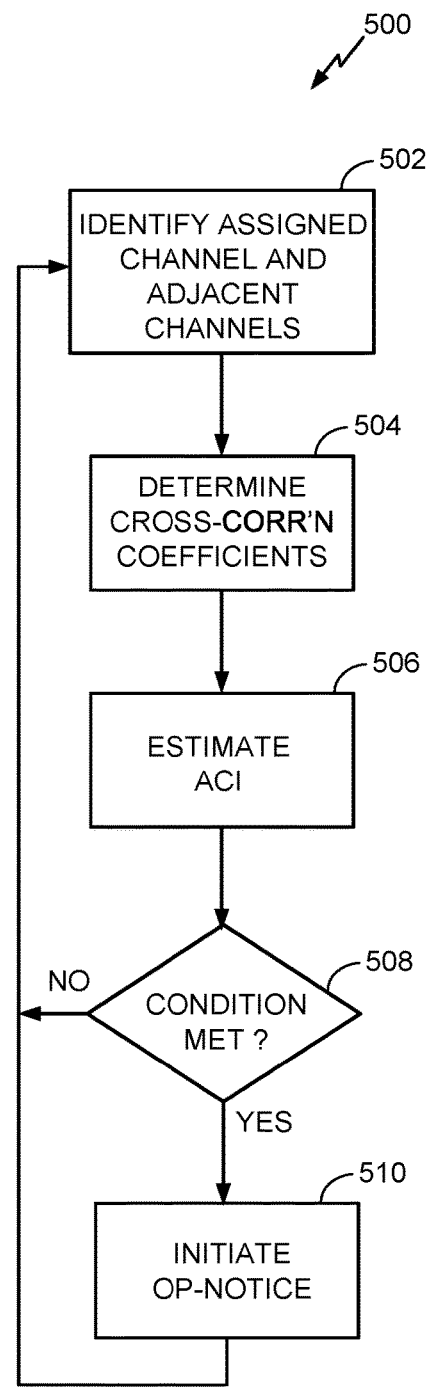
FIG. 5 shows a flow diagram, representing example transmitter operations in one exemplary process within a reduced computation method providing operating point control, according to one or more aspects.

FIG. 5 shows a logic diagram of a flow 500, representing example operations in a process according to various disclosed aspects, providing a controlling of a transmitter amplifier. Operations in the process can, at 502, receive a frequency band that includes an assigned channel, an adjacent channel, and a communication signal from the transmitter amplifier in the assigned channel. The flow 500 can then proceed to 504, where operations can determine cross-correlation coefficients, between the communication signal and the adjacent channel. Operations at 504 can be performed, for example, by the FIG. 1 cross-correlation coefficient logic 132. Upon determining the cross-correlation coefficients, the flow 500 can proceed to 506, where operations can estimate an adjacent channel interference, based at least in part on the cross-correlation coefficients determined at 504. Operations at 506 can be performed, for example, by the FIG. 1 adjacent channel interference estimation logic 134. The flow 500 can then proceed to decision block 508, and determine whether the estimated adjacent channel interference meets a given condition.

Upon a "YES" determination at 508, the flow 500 can proceed to 510, where operations can initiate communicating an operating point notice, toward a local control of the transmitter amplifier. Operations at 508 and 510 can be performed, for example, by the FIG. 1 operating point notice logic 136. In an aspect, assuming operations in the flow 500 are performed by the receiver station 104, the "local control" of the TX-PA 116 can be a resource (not explicitly visible), in the transmitter station 102. In an aspect, wireless communicating the operating point notice can include wireless transmitting the operating point notice, e.g., the OP-NTC described above, and toward the local control. Referring to FIG. 3, an example can be the hub station 306 wireless transmitting the OP-NTC, on the forward uplink 322 to the satellite 304, whereupon the satellite 204 can send it to the VSAT 302, for example, by forward downlink 328.

Figure 6:
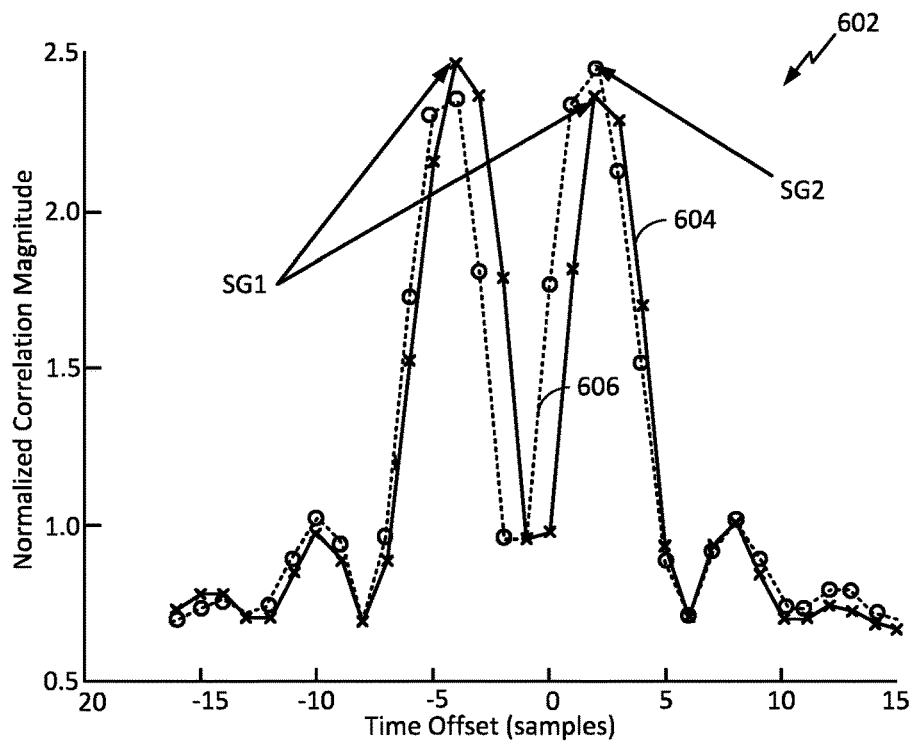
FIG. 6 shows a simulation result, representing prophetic results of estimating cross correlation between an assigned channel and each of its adjacent channels.

FIG. 6 shows a simulation result 602, representing as 604 prophetic results of simulated cross-correlation coefficients between a simulated assigned channel signal and simulated content of a first adjacent channel filter. Plot line 606 represents prophetic results of simulated cross-correlation coefficients between the simulated assigned channel signal and simulated content of a simulated second adjacent channel filter. Significant simulated cross-correlation coefficients between the assigned channel and simulated content of the simulated first adjacent channel filter that differ from second adjacent channel results are annotated as "SG1." Significant simulated cross-correlation coefficients between the assigned channel and simulated content of the simulated second adjacent channel filter that differ from first adjacent channel results are annotated as "SG2." As described herein, weighting techniques may be applied to combine significant cross-correlation coefficients, and a prophetic example can be a maximum ratio combining of the prophetic results 604 with the prophetic results 606.

Figure 7:
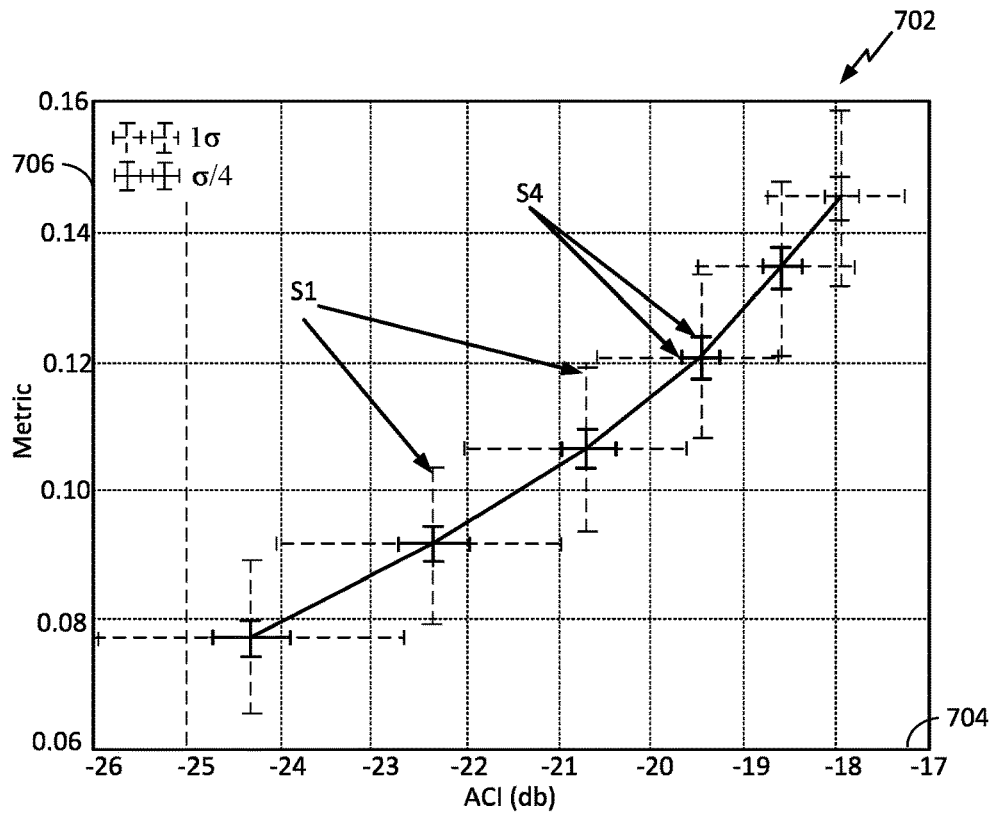
FIG. 7 shows a simulation result, representing prophetic results of estimating power amplifier distortion by averaging cross-correlation coefficients.

FIG. 7 shows a simulation result, 702 representing prophetic results of estimating power amplifier distortion by averaging cross-correlation coefficients. Referring to FIG. 7, simulation ACI power (in dB relative to the desired signal) is plotted on the x-axis, labeled 704. On the y-axis, labeled 706, is the (normalized) simulation value of the correlation-derived metric. The simulation results show clear relationship of correlation-derived metric to the simulated ACI power. FIG. 7 shows bars as marking simulation results showing error due to simulated noise. The 1σ range is shown on the y-axis labeled S1. These values are projected onto the curve, and show where simulated 1σ values will be if the correlation-derived metric are used to estimate the ACI power. Label S4 shows prophetic results of averaging 16 simulation measurements to include reduction in RMS error by a factor of 4.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, implementations and practices according to the disclosed aspects can include a computer readable media embodying a method for de-duplication of a cache. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for controlling a transmitter amplifier, comprising:
    receiving a frequency band that includes an assigned channel, an adjacent frequency channel, and a communication signal from the transmitter amplifier in the assigned channel, the assigned channel and the adjacent channel being respective sub-bands of the frequency band;
    estimating a distortion by the transmitter amplifier, wherein estimating the distortion includes estimating an adjacent frequency interference, the adjacent frequency interference including amplifier distortion components of the communication signal extending into the adjacent frequency channel, wherein estimating the adjacent frequency interference includes:
        determining cross-correlation coefficients, between the communication signal and the adjacent frequency channel, and
        estimating the adjacent channel interference, based at least in part on the cross-correlation coefficients; and
    upon the estimated distortion by the transmitter amplifier, as indicated by the estimated adjacent channel interference, meeting a given condition, initiating communication of an operating point notice, toward a local control of the transmitter amplifier.

2. The method of claim 1, wherein initiating the communication of the operating point notice comprises wireless transmitting the operating point notice toward the local control.

3. The method of claim 2, wherein wireless transmission of the operating point notice toward the local control includes uplink transmitting, from an earth station, to a satellite, and downlink transmission from the satellite toward the local control.

4. The method of claim 1, wherein:
    the adjacent frequency channel is a first adjacent frequency channel,
    the cross-correlation coefficients are first adjacent channel cross-correlation coefficients, and
    the frequency band includes a second adjacent frequency channel, the second adjacent frequency channel being another sub-band of the frequency band, and wherein the method further comprises:
    estimating second adjacent channel cross-correlation coefficients, between the communication signal and the second adjacent frequency channel,
    wherein estimating the adjacent channel interference is further based, at least in part, on the second adjacent channel cross-correlation coefficients.

5. The method of claim 4, further comprising: applying a timing interpolation to the first adjacent frequency channel, or the second adjacent channel, or both, the timing interpolation being configured to compensate for delays in demodulating the communication signal.

6. The method of claim 1, wherein:
    determining cross-correlation coefficients includes demodulating the communication signal to obtain a recovered symbol, and
    the cross-correlation coefficients are each associated with a different time offset from the recovered symbol.

7. A method for controlling a transmitter amplifier, comprising:
    receiving a frequency band that includes an assigned channel, an adjacent channel, and a communication signal from the transmitter amplifier in the assigned channel, the assigned channel and the adjacent channel being respective sub-bands of the frequency band;
    determining cross-correlation coefficients, between the communication signal and the adjacent channel, wherein:
        determining cross-correlation coefficients includes demodulating the communication signal to obtain a recovered symbol, and the cross-correlation coefficients are each associated with a different time offset from the recovered symbol;

estimating an adjacent channel interference based at least in part on the cross-correlation coefficients; and upon the estimated adjacent channel interference meeting a given condition, initiating communication of an operating point notice, toward a local control of the transmitter amplifier, wherein:

demodulating the communication signal is configured to form a series of recovered symbols, a reference time is a periodic reference time that aligns with the recovered symbols, and the cross-correlation coefficients are each associated with a different time offset between the reference time and the adjacent channel.

8. The method of claim 7, wherein:

estimating adjacent channel interference includes estimating a correlation magnitude, based at least in part on a combination of the cross-correlation coefficients, and the estimated adjacent channel interference is based at least in part on the estimated correlation magnitude.

9. The method of claim 8, wherein estimating the correlation magnitude is based, at least in part, on maximum-ratio combining of the cross-correlation coefficients.

10. The method of claim 8, wherein the given condition is the estimated adjacent channel interference having a value that is at least a given maximum.

11. The method of claim 7, wherein the adjacent channel is a first adjacent channel, the cross-correlation coefficients are first adjacent channel cross-correlation coefficients, and the frequency band further includes a second adjacent channel, and wherein the method further comprises:

generating a set of second adjacent channel cross-correlation coefficients, each of the second adjacent channel cross-correlation coefficients being associated with a different time offset between the reference time and the second adjacent channel, wherein estimating correlation magnitude is further based, at least in part, on the set of second adjacent band cross-correlation coefficients.

12. The method of claim 11, wherein estimating correlation magnitude is based, at least in part, on maximum-ratio combining of the first adjacent channel cross-correlation coefficients and the second adjacent channel cross-correlation coefficients.

13. The method of claim 7, wherein:

the different time offset between the reference time and adjacent channel comprises a plurality of different time offsets, and the cross-correlation coefficients comprise a plurality of cross-correlation coefficients, each of the cross-correlation coefficients corresponding to a different time offset among the plurality of different time offsets.

14. The method of claim 7, wherein:

the different time offset between the reference time and adjacent channel comprises at least M different time offsets, and the cross-correlation coefficients comprise at least M cross-correlation coefficients, each of the at least M cross-correlation coefficients corresponding to a different time offset among M different time offsets.

15. The method of claim 14, further comprising:

sampling the recovered symbol, at a sampling time aligned with the reference time, to obtain a symbol sample;

sampling the adjacent channel to obtain, associated with the symbol sample, a set of M adjacent channel samples, each corresponding to a different one among the N time offsets; and generating the set of M cross-correlation coefficients, based on multiplying each of the M adjacent channel samples by the symbol sample, to form a corresponding set of M products, each of the M products being a corresponding one of the set of M cross-correlation coefficients.

16. The method of claim 15, wherein:

the adjacent channel is a first adjacent channel, the frequency band further includes a second adjacent channel, the second adjacent channel being another sub-band of the frequency band, the set of M adjacent channel samples is a set of M first adjacent channel samples, and the corresponding M products are M first products, wherein the method further comprises:

sampling the second adjacent channel to obtain, associated with the symbol sample, a set of M second adjacent channel samples, each corresponding to a different one among the M different time offsets; and generating a set of M second adjacent channel cross-correlation coefficients, based on multiplying each of the M second adjacent channel samples by the symbol sample, to form a corresponding M second products, each of the M second products being a corresponding one of the M second adjacent channel cross-correlation coefficients.

17. The method of claim 14, wherein the set of M cross-correlation coefficients is a first set of M cross-correlation coefficients, wherein the method further comprises:

sampling a first and a second recovered symbol among the series of recovered symbols to obtain a respective first symbol sample and second symbol sample;

sampling the adjacent channel to obtain, associated with the first symbol sample, a first set of M adjacent channel samples, each of the M adjacent channel samples corresponding to one of the different time offsets, relative to the first symbol sample;

multiplying each of the first set of M adjacent channel samples by the first symbol sample to produce a first set of M products;

performing another sampling of the adjacent channel to obtain, associated with the second recovered symbol, a second set of M adjacent channel samples, each of the second set of M adjacent channel samples corresponding to a different one of the M time offsets, relative to second symbol sample among the set of M time offsets;

multiplying each of the second set of M adjacent channel samples by the second symbol sample to form a second set of M products;

adding each product among the second set of M products to a corresponding product among the first set of M products to generate a set of M sum-of-products; and generating a set of M cross-correlation coefficients, each of the cross-correlation coefficients based at least in part on a corresponding sum-of-products among the set of M sum-of-products.

18. A receiver circuit for controlling a transmitter amplifier back-off, comprising:

a receiver antenna;

a filter coupled to the receiver antenna and configured to pass an assigned frequency channel and an adjacent frequency channel, the assigned frequency channel and the adjacent frequency channel being respective sub-bands of the frequency band, a communication signal from the transmitter amplifier being in the assigned channel;

a logic that includes a cross-correlation coefficient logic and an adjacent channel interference estimation logic, configured to estimate a distortion by the transmitter amplifier, the distortion including components of the communication signal extending into the adjacent frequency channel, wherein:

the cross-correlation coefficient logic is configured to generate a set of cross-correlation coefficients, between the assigned channel and the adjacent channel, and the adjacent channel interference estimation logic is configured to estimate the adjacent channel interference based at least in part on the set of cross-correlation coefficients, the estimated adjacent channel interference being the estimate of the distortion; and an operating point notice logic, configured to generate an operating point notice in response to the estimated distortion by the transmitter amplifier, as indicated by the estimated adjacent channel interference meeting a given condition.

19. The receiver circuit of claim 18, wherein the cross-correlation coefficient logic comprises:

a demodulator logic, configured to demodulate a signal in the assigned frequency channel and output a corresponding recovered symbol stream;

a recovered symbol sampler, configured to sample the recovered symbol stream and generate, for each symbol in the recovered symbol stream, a corresponding symbol sample; and an adjacent channel sampler, configured to sample the adjacent channel at a rate and timing that generates, in association with each symbol sample, M adjacent channel samples, the M adjacent channel samples corresponding to M different time offsets relative to the symbol sample, wherein the cross-correlation coefficient logic is configured to multiply a symbol sample among the symbol samples by each of the M corresponding adjacent channel samples, to generate a set of M products, store the set of M products in a set of M accumulators, to initialize a set of M sums-of-products, repeat for K iterations an operation that includes multiply a next symbol sample among the symbol samples by each of the M adjacent channel samples corresponding to the next symbol sample, to generate a new set of M products, and add the new set of M products to the set of M accumulators, to update the set of M sums-of-products, and output the content of the set of M accumulators as a set of M cross-correlation coefficients.

20. The receiver circuit of claim 19, wherein the adjacent channel interference estimation logic is configured to estimate the cross-correlation, based at least in part on applying different weightings to the cross-correlation coefficients in the set of cross-correlation coefficients.

21. The receiver circuit of claim 18, further comprising:

a demodulator logic, configured to demodulate a signal in the assigned frequency channel and output a corresponding recovered first symbol and recovered second symbol;

a recovered symbol sampler, configured to sample the recovered first symbol and the recovered second symbol, and generate a corresponding first symbol sample and second symbol sample; and an adjacent channel sampler, configured to sample the adjacent frequency channel at a rate and timing that generates, in association with the first symbol sample, a first set of M adjacent channel samples, corresponding to M different time offsets relative to the first symbol sample, and in association with the first symbol sample a second set of M adjacent channel samples, corresponding to M different time offsets relative to the second symbol sample, wherein the cross-correlation coefficient logic is configured to multiply the first symbol sample among the symbol samples by each of the first set of M adjacent channel samples, to generate a first set of M products, multiply the second symbol sample among the symbol samples by each of the second set of M adjacent channel samples, to generate a second set of M products, a add each product among the second set of M products to a corresponding product among the first set of M products to generate a set of M sum-of-products, and generate a set of M cross-correlation coefficients, each of the cross-correlation coefficients based at least in part on a corresponding sum-of-products among the set of M sum-of-products.

22. The receiver circuit of claim 21, further comprising:

a timing interpolator, in the filter or in series with the filter, in the path of the adjacent frequency channel and configured to compensate for a delay in the demodulator logic.

* * * * *